United States Patent [19]
McGregor

[11] 3,909,970
[45] Oct. 7, 1975

[54] WATERFOWL DECOY WITH ANCHOR LINE STORAGE AND DEPLOYMENT MEANS

[76] Inventor: Carl R. McGregor, 57 Mecartney Road, Alameda, Calif. 94501

[22] Filed: Aug. 19, 1974

[21] Appl. No.: 498,563

[52] U.S. Cl. ................................................. 43/3
[51] Int. Cl.² ...................................... A01M 31/06
[58] Field of Search ............................... 43/3, 43.11

[56] References Cited
UNITED STATES PATENTS

| | | | |
|---|---|---|---|
| 1,370,145 | 3/1921 | Moore | 43/3 |
| 1,437,764 | 12/1922 | Lloyd | 43/3 |
| 2,817,918 | 12/1957 | Phillips | 43/3 |
| 3,613,289 | 10/1971 | Wehren | 43/43.11 |

Primary Examiner—Warner H. Camp
Attorney, Agent, or Firm—Warren, Rubin & Chickering

[57] ABSTRACT

A waterfowl decoy has an improved anchor line storage and deployment means which is preferably formed as an annular member mounted proximate the base of the decoy and formed with a circumferentially extending tapered surface adapted to retain the anchor line in a coiled condition proximate the periphery of the base. Upon release of the anchor means, the weight of the anchor will cause paying out of the line automatically as the downward pull of the weight of the anchor causes successive coils to be pulled off the tapered surface of the storage and deployment means. Several forms of storage and deployment means suitable for storage of the anchor line and gravity paying out of the same are disclosed.

5 Claims, 5 Drawing Figures

U.S. Patent  Oct. 7, 1975  3,909,970
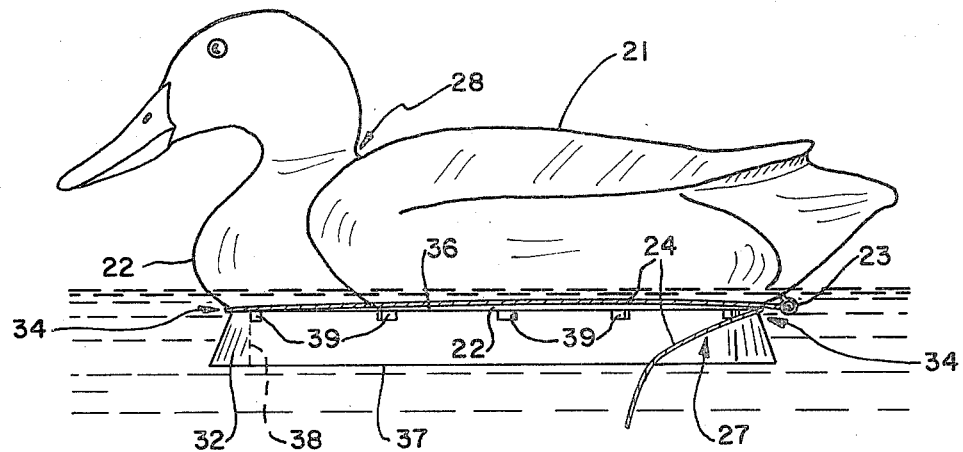
FIG.—1
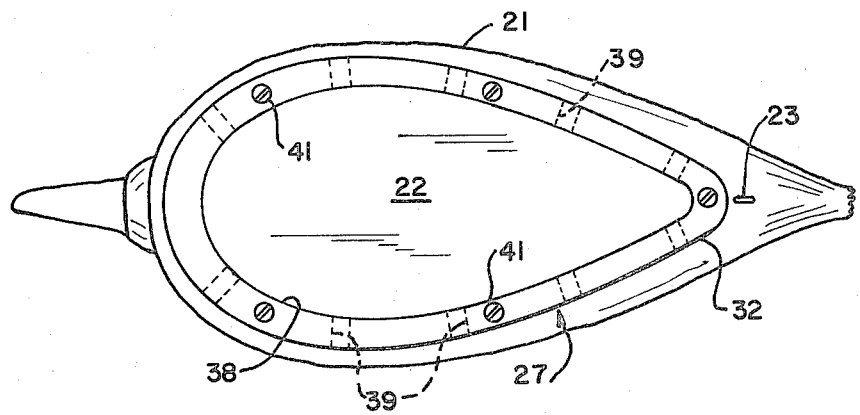
FIG.—2
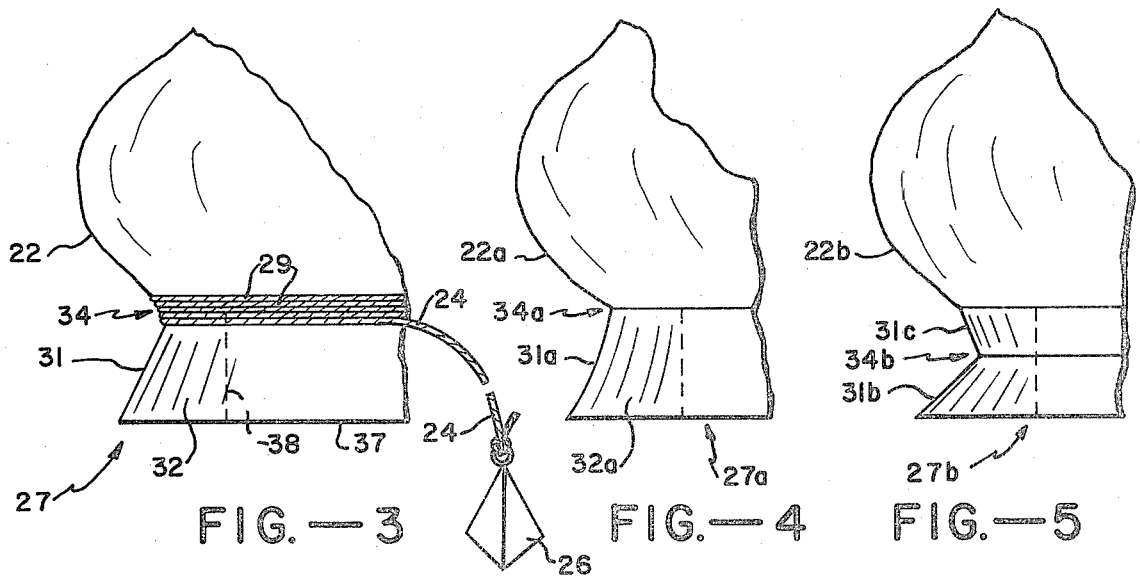
FIG.—3   FIG.—4   FIG.—5

WATERFOWL DECOY WITH ANCHOR LINE STORAGE AND DEPLOYMENT MEANS

BACKGROUND OF THE INVENTION

The use of decoys in connection with hunting waterfowl, such as ducks, geese and the like, is quite common. In some instances these waterfowl decoys can be left at the hunting site, but more commonly, the hunter must deploy and retrieve the decoys each day that he goes hunting. When the hunting takes place in a deep water area, for example, a lake, bay, river, slough, etc. the decoys must be anchored by anchor means connected to the decoy by a long anchor line. Even when hunting on ponds of modest depth, it is preferable to anchor the decoys so as to prevent their drifting in the wind or current.

A number of different decoy anchoring techniques have been devised. The most common approach is simply to attach a long line, having an anchor at the end, to the base of the decoy and store the line by wrapping it around the neck and the tail of the decoy, which normally is formed with a notch or recess. When the decoys are being deployed at 4:00 a.m. on a winter day, the weather is often cold and windy and the hunter is not able to see well. Accordingly, unwrapping the line from the neck and tail of many decoys to deploy the anchors is usually tedious, cumbersome and undesirably time-consuming.

Attempts have been made to improve upon the simple wrapping of an anchor line around the decoy by providing anchor line storage devices and specialized anchors. One such device is shown in U.S. Pat. No. 2,709,866, but while providing a storage structure, this type of device requires a tedious unwinding of the anchor line from the storage device. In U.S. Pat. Nos. 1,417,441 and 1,468,780 the anchor line is stored on a reel to enhance deployment. However, in U.S. Pat. No. 1,417,441 the reel is stored in the base and requires the tedious disassembly of the base and the body of the decoy to allow access to the reel and deployment of the anchor. Such an approach is even less practical under field conditions than unwinding the anchor line from the decoy. The reel of U.S. Pat. No. 1,468,780 is constructed in a manner which is more convenient for the purpose of deployment; however, this approach has several serious defects. First, duck hunting is very often conducted in salt water and even more often in dirty water having debris and the like floating thereon. The movable or rotating reel of U.S. Pat. No. 1,468,780, therefore, is subjected to corrosion and jamming of the rotating mechanism by debris. The environment in which the reel is constantly immersed soon results in its inoperativeness. Moreover, such rotating reel constructions are inherently substantially more costly than stationary devices.

In U.S. Pat. Nos. 2,268,963 and 3,733,733 special storage bases are affixed to waterfowl decoys so that the anchor line can be conveniently wound around the base of the decoy. While these devices provide a convenient means for storage of line, they still require the manual unwrapping of the line from the base upon deployment. Both of these devices are formed as relatively thin members or plates with the anchor line wrapped around a tight 180° turn at each end. In U.S. Pat. No. 3,733,733 the spring clips designed to control the length of the anchor line also have the effect of impeding and preventing paying out of the line except by manual unwrapping of the same. In U.S. Pat. No. 2,268,963, the pivotal notched rudder and the sharpness of the turns around the storage plate will cause binding of the line requiring manual unwrapping of coils to deploy the anchor.

Finally, anchor means have been devised which not only effect anchoring of the decoy, but are constructed in a manner to cause the decoy to be tipped upright if it is blown over, for example, U.S. Pat. No. 1,605,054. No provision is made, however, for automatic deployment of the anchor line from such a structure.

Accordingly, it is an object of the present invention to provide a waterfowl decoy having an anchor line storage and deployment means which enables rapid deployment and retrieval of decoys.

It is a further object of the present invention to provide a waterfowl decoy having an anchor line storage and deployment means which enhances stacking and transportation of the decoys when not in use.

Still a further object of the present invention is to provide a waterfowl decoy having an anchor line storage and deployment means which provides improved stability of the decoy in the water.

It is still a further object of the present invention to provide a waterfowl decoy having an anchor line deployment and storage means which is inexpensive to construct, has no moving parts, may be adapted for installation to a variety of different types of decoys, and is highly durable.

The improved waterfowl decoy of the present invention has other objects and features of advantage some of which will become more apparent from and are set forth in detail in the following specification and accompanying drawing.

SUMMARY OF THE INVENTION

The waterfowl decoy includes a base portion, anchor means, and an anchor line connecting the anchor means to the decoy, with the improvement of the present invention comprising, briefly, anchor line storage and deployment means mounted to the decoy proximate the base and adapted to retain the anchor line in a coiled condition extending circumferentially proximate the periphery of the base, the storage and deployment means being further adapted for automatic gravity induced paying off of the anchor line therefrom by successive sliding of coils off the storage and deployment means. The storage and deployment means preferably are provided by substantially continuous, smooth, unimpeded surface on an annular member which surface is outwardly tapered to provide a line receiving recess and yet enable sliding of coils off the periphery of the surface under the weight of the anchor. The base of the annular storage and deployment means is preferably flat for stacking of the decoys, is weighted to provide stability in the water, and includes channels for the passage of trapped air out from under the decoy.

DESCRIPTION OF THE DRAWING

FIG. 1 is a side elevational view of a waterfowl decoy having an anchor line storage and deployment means constructed in accordance with the present invention affixed to the base thereof.

FIG. 2 is a bottom plan view of the waterfowl decoy of FIG. 1.

FIG. 3 is an enlarged, fragmentary, side elevational view of a front portion of the decoy of FIG. 1.

FIG. 4 is an enlarged, fragmentary, side elevational view of the front portion of a decoy having an alternative embodiment of the anchor line storage and deployment means of the present invention mounted thereto.

FIG. 5 is an enlarged, fragmentary, side elevational view of the front portion of a decoy having a still further alternative embodiment of the anchor line storage and deployment means of the present invention mounted thereto.

DESCRIPTION OF THE PREFERRED EMBODIMENTS

Referring now to FIGS. 1, 2 and 3, the waterfowl decoy of the present invention can be seen to have a body 21, having the general configuration of the waterfowl to be decoyed, and a base portion 22. Connected by fastener 23 to the decoy is anchor line 24, which has anchor means 26 affixed to an opposite end of the anchor line. Anchor means 26 is shown as a weight, but it can have other configurations, including protruding portions which engage the bottom to effect anchoring of the decoy. The elements thus far described are conventional and are found in the previously referenced prior art.

In order to provide for storage and automatic deployment, the waterfowl decoy of the present invention further includes anchor line storage and deployment means, generally designated 27, which is mounted to the decoy proximate base 22. Storage and deployment means 27 is adapted to retain anchor line 24 in a coiled condition (best shown in FIGS. 1 and 3) with the anchor line extending circumferentially proximate the periphery of base 22. Thus, line 24 can be manually coiled about storage and deployment means 27 and stored in that position so long as the weight of anchor 26 is not free to pull the line off the storage and deployment means. The body of the decoy itself, however, affords a simple and convenient structure for storing anchor weight 26 in a position which does not pull the line off means 27. It is a simple matter, for example, to pass anchor 26 over the notch 28 formed between the neck and back of the decoy so that the weight of the anchor is taken up at notch 28.

Additionally, storage and deployment means 27 is further adapted for automatic gravity induced paying off of anchor line 24 therefrom by successive sliding of coils 29 of the anchor line off means 27 when the anchor is released from notch 28 so that the weight thereof may pull the anchor line. The user may simply grasp the decoy and swing the anchor line up from notch 28 to free the anchor. The decoy may then be thrown overboard, without unwinding line 24 from means 27, and the downward weight of anchor 26 will pull successive coils 29 downwardly off the periphery of means 27 until the anchor hits bottom. Depending upon the depth of the water, the remainder of the line may pay out as the decoy is moved by wind or current conditions, but the length of anchor line 24 is preferably pre-selected, or adjusted by fasteners or the like, to approximate the depth of the body of water in which the decoys are to be employed.

As will be seen in FIGS. 1 through 3, it is preferable that the storage and deployment means be provided by a substantially continuous, smooth, unimpeded surface 31 which is formed on the outside of a generally annular member 32, which extends around and depends downwardly from the decoy proximate the periphery of base portion 22. While it is preferable that storage and deployment means 27 be formed as a continuous annular member 32, as will be understood, means 27 could also take the form of a plurality of separate and spaced apart elements around the periphery of base 22 which would distend the coils of the line in an annular or oval-shaped path around the periphery. Surface 31 is also further preferably formed to radially outwardly taper in the downward direction. This radial outward tapering, best seen in FIGS. 1 and 3, causes the formation of a recess or notch 34 at the base of the decoy in which coils 29 of the line will be retained.

Unlike some prior art devices, however, the radial outward tapering of surface 31 does not interfere with or prevent the automatic, gravity induced, paying out of the line. The formation of member 32 as an annular member which extends proximate the periphery of the base of the decoy insures that the anchor line 24 is never forced to be wound back upon itself through a very tight angle. Thus, the oblique angle at which the coils are wrapped around the decoy when combined with the outward tapering of surface 31 is never great enough to effect a binding action between the line and surface 31. When the anchor is released, it will drop straight down causing the line to slip or slide out of notch 34 and off the periphery of member 32 without binding. By contrast, the sharp platelike prior art devices bind at each end of the plate with the line being unable to pass beyond the protruding edge of the plate.

As is shown in FIGS. 1 through 3, surface 31 is formed as a generally frusto-conical surface having a small diameter end 36 mating with base 22 of the decoy to form annular recess 34. Thus, the combination of surface 31 and the decoy define notch 34.

As will be seen in FIG. 4, member 32a is formed with a concave surface 31a which mates with base portion 22a to define an annular notch 34a. The anchor line can be conveniently stored and retained in notch 34a of deployment means 27a, and yet it will readily pay out automatically upon release of the anchor without the need for manual uncoiling or unwinding of the line.

In FIG. 5, still a further alternative embodiment of the waterfowl decoy of the present invention illustrates an anchor line storage and deployment means 27b which has a pair of frusto-conical surfaces 31b and 31c which define therebetween an annular recess or notch 34b for receipt of the anchor line. As will also be noted, means 27b is recessed inwardly to some degree from the periphery of base 22b, and further, instead of forming means 27b as an annular member, it is here depicted as being a solid oval-shaped disc. There is considerable flexibility in the distance which the storage and deployment means may be radially inwardly recessed from the periphery of the base, as long as the recessing of the same does not create such a small diameter of the storage and deployment means that the line is bent back upon itself to a degree causing binding.

Referring again to FIGS. 1 through 3, the anchor line storage and deployment means of the present invention has the additional advantage of enabling the decoys to be stacked on a planar surface in a very stable condition. Namely, the annular member 32 is preferably formed with a flat bottom surface 37 which means that the decoys will sit in an upright position on a planar surface such as the bottom of a boat, a pier or the like.

This highly stable condition allows a bottom layer of decoys to perform a very stable base for the pyramid stacking of decoys, an important advantage since it is preferable to deploy a substantial number of decoys while hunting.

Additionally, it is an important advantage of the anchor line storage and deployment means of the present invention that it be formed in a manner to enhance stability of the decoy in water. Thus, annular base 32 can be formed as a member having a specific gravity greater than water to provide a stabilizing weight at the periphery of the base. This can be accomplished by forming means 27 of a plastic material having weights embedded therein. The peripheral orientation of the weights provides a strong righting moment in the event that the wind or current tends to tip the decoy.

When storage and deployment means 27 is formed as an annular member, the inside surface 38 could trap air underneath the bottom or lowermost portion of the decoy. Thus, it is a further feature of the present invention to provide at least one air escape channel 39, and preferably a plurality of channels 39, positioned to allow escape of air trapped inside wall 38 and beneath the decoy. Channels 39 are shown as bores or openings, but it will be understood that they may take the form of slots or the like. In addition to allowing air to pass out from underneath the decoy when it is first placed in the water, the channels have some effect in acting as orifices which meter the passage of water therethrough when the decoy is displaced laterally through the water.

The anchor line storage and deployment means of the present invention can be integrally formed with the decoy or fastened to base 22 by means of fasteners 41, adhesives, or the like. The ability to fasten the anchor line storage and deployment means of the present invention rapidly to the decoy allows the hunter to convert his existing decoys to decoys which will automatically pay out the anchor line by the use of conventional tools and straightforward techniques. Since the vast majority of waterfowl decoys are of the same general size, two or three different sizes of deployment means will adapt to virtually all decoys. This is particularly true if the annular member 27 is formed of a plastic which will resiliently deform to conform to the surface irregularities at the base of the decoy.

What is claimed is:

1. In a waterfowl decoy having a body of substantially the same size and configuration as the waterfowl to be simulated, said body including a base portion, decoy anchor means, an anchor line connecting said anchor means to said decoy, an anchor line storage and deployment means mounted to said decoy proximate said base portion, and said body being further formed for releasable support of the weight of said anchor means by said decoy, the improvement comprising:

said anchor line storage and deployment means being provided as a substantially continuous, smooth, radially outwardly and downwardly tapering surface extending around and depending downwardly from said decoy proximate the periphery of said base portion, said surface being formed to provide an annular anchor line storage recess of substantial peripheral length for retention of relatively large coils of said anchor line coiled around said body of said decoy, and said surface having a radius of curvature about said base and an outward taper enabling automatic gravity paying off of said coils of said anchor line upon release of the weight of said anchor means, said storage and deployment means being further formed with a flat bottom subjacent said surface, said bottom being adapted to retain said decoy in a stable upright position when said decoy is placed on a planar horizontal surface.

2. A waterfowl decoy as defined in claim 1 wherein, said surface is formed to mate with said decoy proximate said base portion to form with said decoy said recess for receipt and storage of said anchor line.

3. A waterfowl decoy as defined in claim 2 wherein, said surface is frusto-conical with the small diameter end mating with said decoy to form said recess.

4. A waterfowl decoy as defined in claim 2 wherein, said surface is a concave surface.

5. A waterfowl decoy as defined in claim 1 wherein, said storage and deployment means is formed as an annular member depending downwardly below the lowermost portion of said decoy, said member being formed with at least one air escape channel therethrough positioned to allow the escape of air trapped inside said member and beneath said decoy upon placing of said decoy in water.

* * * * *